United States Patent [19]
Baumann et al.

[11] 3,818,050
[45] June 18, 1974

[54] PROCESS FOR THE MANUFACTURE OF DIMETHYLMALEIC ANHYDRIDE

[75] Inventors: Marcus Baumann; Hans Bosshard, both of Basel, Switzerland

[73] Assignee: Ciba-Geigy Corporation, Ardsley, N.Y.

[22] Filed: June 22, 1972

[21] Appl. No.: 265,405

[30] Foreign Application Priority Data
July 13, 1971 Switzerland................ 10265/71

[52] U.S. Cl....... 260/346.8 R, 260/295, 260/296 R, 260/249.8, 260/306.8, 260/252
[51] Int. Cl............................................. C07d 5/10

[58] Field of Search............................. 260/346.8 R

[56] References Cited
UNITED STATES PATENTS
3,017,417    1/1962    Harkes............................ 260/346.8

Primary Examiner—Henry R. Jiles
Assistant Examiner—Bernard Dentz

[57] ABSTRACT

A new improved process for preparing dimethylmaleic acid anhydride is disclosed which comprises reacting certain N-mono-substituted heterocyclic amidines or salts thereof with fumaric acid, maleic acid or a derivative thereof at temperatures above 70°C.

8 Claims, No Drawings

PROCESS FOR THE MANUFACTURE OF DIMETHYLMALEIC ANHYDRIDE

The present invention relates to a process for the manufacture of dimethylmaleic anhydride and to the dimethylmaleic anhydride manufactured according to this process.

Although various methods for the manufacture of dimethylmaleic anhydride are known from the literature, these processes have not attained any economic importance, since they lead to low yields and/or require the use of starting products which are expensive or difficult to obtain.

It has now been found that dimethylmaleic anhydride, that is to say the compound of the formula I

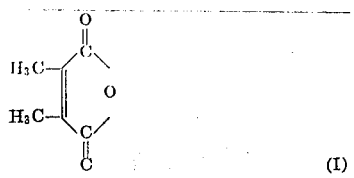

(I)

can be obtained in a considerably simpler and above all more economical manner, in very good yields, if, at a temperature above 70°C a. at least 1 mol of an amidine of the formula IIa

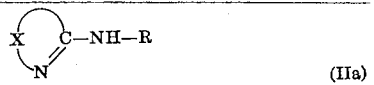

(IIa)

wherein X together with the grouping

forms the radical of a five-membered or six-membered hetero-ring which is optionally substituted further and which can contain additional hetero-atoms, especially —S—, —N— and —O— atoms, and R denotes an alkyl radical with one to six carbon atoms, a cycloalkyl radical or a carboxyalkyl radical with one to three carbon atoms in the alkyl radical, is reacted with 2 mols of fumaric acid or maleic acid or b. at least 1 mol of an amidine salt of the formula IIb

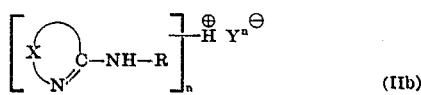

(IIb)

wherein X and R have the meaning indicated under the formula IIa and Y denotes the anion of an organic or inorganic acid and n denotes an integer from 1 to 3, especially 1 or 2, is reacted with 2 mols of maleic anhydride or fumaric or maleic acid or c. a salt of maleic or fumaric acid with an amidine of the formula IIa is reacted and the reaction mixture is optionally treated with acid.

Preferably, maleic anhydride and especially maleic acid are employed in the process according to the invention.

Examples which may be mentioned of a five-membered or six-membered hetero-ring formed by X together with the grouping

, which is optionally substituted further and can contain additional hetero-atoms, are imidazolyl, pyrazolyl, triazolyl, thiazolyl, isothiazolyl, oxdiazolyl, thiadiazolyl, oxazolyl, pyridinyl, pyridazinyl, pyrimidinyl, pyrazinyl and triazinyl radicals.

If these radicals are substituted further, they can, for example, contain halogens, such as fluorine, chlorine or bromine, phenyl groups, alkyl or alkoxy groups with one to four carbon atoms, amino groups, monoalkylamino or dialkylamino groups with one to four carbon atoms in each alkyl radical or hydroxyl groups, or can be fused to further homocyclic or heterocyclic rings. As examples of fused five-membered or six-membered hetero-ring systems there may be mentioned: benzimidazole, benzthiazole, benzoxazole, pterine, purine, quinoline, isoquinoline, naphthyridine, phthalazine, cinnoline, quinazoline and quinoxaline.

Preferably, the radical of a five-membered or six-membered hetero-ring represented by X together with the grouping

is not substituted further; the pyridinyl-2 and the 1,3-thiazolyl-2 radical are very particularly preferred.

If R in the formula IIa or IIb represents an alkyl radical with one to six carbon atoms this is, for example, the methyl, ethyl, n-propyl, isopropyl, n-butyl, sec-butyl, tert-butyl, n-pentyl, isopentyl or n-hexyl group. A possible cycloalkyl group represented by R is especially the cyclo-hexyl radical, whilst when R denotes a carboxyalkyl radical it above all represents the carboxymethyl or carboxyethyl radical. Preferably, R denotes cyclohexyl or methyl.

The amidines of the formula IIa are known or can be manufactured in a manner which is in itself known. As examples of suitable compounds of the formula IIa there may be mentioned: 2-methylamino-1,3-thiazole, 4-methyl-2-methylamino-1,3-thiazole, 2-methylaminopyridine, 2-cyclohexylaminopyridine, 2-carboxyethylaminopyridine, 4,6-di-(N-ethylamino)-2-chloro-pyrimidine, 2,4-di-(N-ethylamino)-6-chloro-1,3,5-triazine, 7-methyl-6-methylaminopurine, 6-methylaminopurine, 2-methylaminoquinoline, 2-n-butylaminoquinoline and 2-cyclohexylaminoquinoline.

Preferably, 2-cyclohexylaminopyridine or 2-methylamino-1,3-thiazole is used as the amidine of the formula IIa in the process according to the invention.

If, in the process according to the invention, amidine salts of the formula IIb are used as starting products, $n$ represents an integer from 1 to 3 and Y preferably represents the anion of formic, acetic, hydrochloric, hydrobromic, sulphuric or phosphoric acid. However, it is very particularly preferred that Y is the anion of sulphuric acid ($n = 1$ or 2). These salts can be manufactured in the usual manner by treating the amidine in question, of the formula IIa, with the appropriate acid.

The reaction according to the invention can be carried out in an organic solvent which is inert towards the reactants, such as optionally chlorinated aromatic hydrocarbons, for example, benzene, toluene, xylenes, chlorobenzene or dichlorobenzenes, dialkylsulphoxides, for example, dimethylsulphoxide, methylcellosolve, hexamethylphosphoric acid triamide (hexametapol), N,N-dialkylamides of a lower monocarboxylic acid, for example dimethylformamide or dimethylacetamide, or lower dialkyl esters of carbonic acid, for example, dimethyl carbonate or diethyl carbonate. Mixtures of such solvents can also be used. Appropriately, the solvent is removed before any treatment with acid, for example, by distilling it off.

According to a preferred embodiment, the reaction according to the invention is carried out without addition of a solvent.

If the starting substance is a salt of fumaric or maleic acid with an amidine of the formula IIa, free fumaric or maleic acid or maleic anhydride can also be added to the reaction mixture.

The reaction temperature can vary within wide limits depending on the nature of the reaction medium; the reaction is advantageously carried out at temperatures between 110° and 160°C.

Usually, the amidine of the formula IIa and fumaric or maleic acid, or the amidine salt of the formula IIb and maleic anhydride, are employed in a mutual molar ratio of 1:2 to 3.5:2; however, a molar ratio of 1:2 is preferred.

It has proved desirable, in order to increase the yields, to treat the reaction mixture with acid, for example by subjecting it to an after-treatment in an acid medium, preferably in an aqueous-organic or aqueous-inorganic acid, under reflux conditions.

Examples of possible organic acids are formic acid, trichloroacetic acid, trifluoroacetic acid, methanesulphonic acid and p-toluenesulphonic acid and examples of possible inorganic acids are sulphuric acid, phosphoric acid, nitric acid, hydrochloric acid and perchloric acid. Treatment of the reaction mixture with aqueous-inorganic acid, above all aqueous sulphuric acid, is very particularly preferred.

The dimethylmaleic anhydride formed can be isolated in the usual manner, for example by filtering it off or by steam distillation.

After conclusion of the reaction or of the treatment with acid, the liberated amidine or amidine salt can be recovered practically quantitatively, for example by extraction with a water-insoluble organic solvent, such as methylene chloride, from the mother liquor which has been rendered alkaline.

It is also possible to carry out the process according to the invention semi-continuously by feeding fresh fumaric or maleic acid or fresh maleic anhydride to the reaction mixture and simultaneously isolating the dimethylmaleic anhydride formed.

Dimethylmaleic anhydride is an industrially valuable product which can be used, for example, as a drug for regeneration of the retina in the event of spot formation in the retina, or as the starting product for the manufacture of scents and aromas [see Recueil, 85(1966)43–55].

EXAMPLE 1

A mixture of 8.8 g of 2-cyclohexylaminopyridine and 11.6 g of maleic acid is heated to 150°C whilst stirring, until the evolution of $CO_2$ has ceased. Thereafter, 25 ml of 4 N $H_2SO_4$ are added to the reaction solution and the mixture is boiled for 1 hour under reflux. After cooling to approx. 20°C, the practically colourless dimethylmaleic anhydride precipitates in a crystalline form (2.0 g). During the reaction, 1.6 g of dimethylmaleic anhydride sublime in the condenser. Yield: 3.6 g (57 percent of theory), melting point 92°–93°C.

The 2-cyclohexylaminopyridine used as the starting product in the above example can be manufactured in accordance with methods which are in themselves known, for example, by Tschitschibabin's method from 2-chloropyridine and cyclohexylamine in the presence of sodium amide.

Dimethylmaleic anhydride is obtained in practically the same yield if in the above example, paragraph 1, instead of 11.6 g of maleic acid the same amount of fumaric acid or 11.6 g of a mixture of equal or different parts of fumaric and maleic acid is used and otherwise the same procedure is employed.

If in Example 1, paragraph 1, instead of 8.8 g of 2-cyclohexylaminopyridine the equimolar amount of one of the amidines listed in Table I below, column 2, is used and otherwise the same procedure is followed, dimethylmaleic anhydride is obtained analogously.

TABLE I

| Example number | Amidine |
| --- | --- |
| 2 | $CH_3CH_2HN-$ pyrimidine ring with Cl $-NHCH_2CH_3$ |
| 3 | pyridine$-NH-CH_2-CH_2-COOH$ |
| 4 | pyridine$-NH-CH_3$ |
| 5 | quinoline$-NH-C_4H_9$ |
| 6 | $H_3C-NH$ purine ring $CH_3$ |

The 2-carboxyethylaminopyridine used in Example 3 can be manufactured in accordance with methods which are in themselves know, for example from 2-aminopyridine and an ester of β-chloropropionic acid in the presence of sodium amide with subsequent hydrolysis.

EXAMPLE 7

A mixture of 6.4 g of 2-methylamino-1,3-thiazole and 11.6 g of maleic acid is heated to 150°C whilst stirring, until the evolution of $CO_2$ has ceased. Thereafter, 25 ml of 4 N $H_2SO_4$ are added to the reaction mixture and the whole is boiled for 1 hour under reflux. After cooling to approx. 20°C, the practically colourless dimethylmaleic anhydride precipitates in the form of crystals (2.0 g). During the reaction, 1.2 g of dimethylmaleic anhydride sublime in the condenser. Yield: 3.2 g (51 percent of theory); melting point 92°–93°C.

The dimethylmaleic anhydride is obtained in practically the same yield if, in the above example, instead of 11.6 g of maleic acid the same amount of fumaric acid or 11.6 g of a mixture of equal parts of fumaric and maleic acid is used and otherwise the same procedure is employed.

EXAMPLE 8

14.7 g of 2-cyclohexylaminopyridine hydrogen sulphate and 9.8 g of maleic anhydride are warmed to 160°C until the evolution of $CO_2$ has ceased. Thereafter, 25 ml of 4 N $H_2SO_4$ are added and the mixture is boiled for 1 hour under reflux. After cooling to room temperature (approx. 20°C) 2.1 g (33 percent of theory) of dimethylmaleic anhydride are isolated from the reaction solution, including the part which has sublimed in the condenser; melting point 92°–93°C.

If in the above example, instead of 14.7 g of 2-cyclohexylaminopyridine hydrogen sulphate, the equimolar amount of one of the amidine salts listed in Table II below, column 2, is used and otherwise the same procedure is employed, dimethylmaleic anhydride is obtained analogously.

TABLE II

| Example number | Amidine salt |
|---|---|
| 9 | 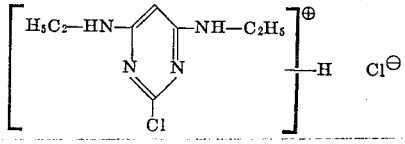 |
| 10 | 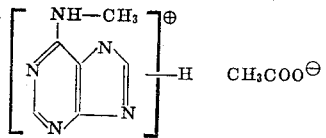 |
| 11 | 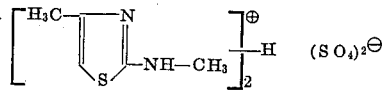 |

EXAMPLE 12

14.7 g of 2-cyclohexylaminopyridine hydrogen sulphate and 9.8 g of maleic anhydride are dissolved in 30 ml of dimethylformamide and boiled under reflux until the evolution of gas has ceased. Thereafter the dimethylformamide is distilled off, 25 ml of 4 N $H_2SO_4$ are added to the residue and the mixture is boiled for 1 hour under reflux. After cooling to approx. 20°C, 1.5 g (25 percent of theory) of dimethylmaleic anhydride are obtained; melting point 92°–93°C.

EXAMPLE 13

A mixture of 8.8 g of 2-cyclohexylaminopyridine and 11.6 g of fumaric acid is heated to 150°C whilst stirring until the evolution of $CO_2$ has ceased. Thereafter the reaction solution is kept at this temperature for a further hour and is then cooled to approx. 20°C. 1.0 g (16 percent of theory) of dimethylmaleic anhydride are obtained; melting point 92°–93°C.

EXAMPLE 14

14.6 g of the salt from equimolar amounts of maleic acid and 2-cyclohexylaminopyridine are heated to 150°–160°C, whilst stirring, until the evolution of $CO_2$ which starts at 120°C has ceased. Thereafter, 25 ml of 4 N $H_2SO_4$ are added and the mixture is boiled for 1 hour under reflux. After cooling to 0° – 5°C, 1.4 g (44.5 percent of theory) of dimethylmaleic anhydride are isolated from the reaction solution, including the part which has sublimed in the condenser; melting point 92° – 93°C.

EXAMPLE 15

A mixture of 8.8 g of 2-cyclohexylaminopyridine and 11.6 g of maleic acid is heated to 150°C whilst stirring until the evolution of $CO_2$ has ceased. During the evolution of $CO_2$, 0.8 g (12.7 percent of theory) of dimethylmaleic anhydride sublimes in the condenser; melting point 92°–93°C. A further 11.6 g of maleic acid are then added to the reaction mixture, and the whole is warmed to 150°–160°C for a further hour. A further 1.4 g (22.2 percent of theory) of dimethylmaleic anhydride of melting point 92° – 93°C are isolated through sublimation in the condenser.

We claim:

1. Process for the manufacture of the compound of the formula I

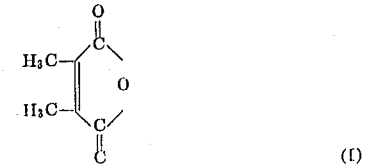

(I)

wherein, at a temperature above 70°C, a. at least 1 mole of an amidine of the formula IIa

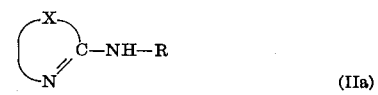

(IIa)

wherein X together with the grouping —N=C— forms the radical of a five-membered or six-membered hetero-ring which is optionally substituted further and which can contain additional hetero-atoms, especially —S—, —N— and —O— atoms, and R is alkyl with one to six carbon atoms, cycloalkyl or carboxyalkyl with the alkyl having one to three carbon atoms, is reacted with 2 mols of fumaric acid or maleic acid or b. at least 1 mol of an amidine salt of the formula IIb

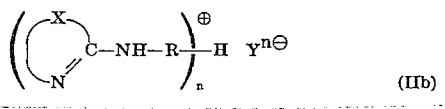
(IIb)

wherein X and R have the meaning indicated under the formula IIa and Y denotes the anion of an organic or inorganic acid and $n$ denotes an integer from 1 to 3, is reacted with 2 mols of maleic anhydride or fumaric or maleic acid or c. a salt of maleic or fumaric acid with an amidine of the formula IIa is reacted and the reaction mixture is optionally treated with acid.

2. Process according to claim 1, wherein an amidine of the formula IIa or an amidine salt of the formula IIb, in which X together with the grouping

forms the pyridinyl-2 or the 1,3-thiazolyl-2 radical, R denotes the cyclohexyl or methyl radical, $n$ denotes an integer from 1 to 3 and Y denotes the anion of an organic or inorganic acid, is used.

3. Process according to claim 1, wherein maleic anhydride or maleic acid is used.

4. Process according to claim 1, wherein the reaction is carried out at a temperature of 110° to 160°C.

5. Process according to claim 1, wherein the reaction is carried out without the addition of a solvent.

6. Process according to claim 1, wherein the reaction mixture is treated with aqueous-inorganic acid.

7. The process of claim 2 wherein the anion of the inorganic acid is the anion of sulphuric acid.

8. The process of claim 6 wherein the aqueous inorganic acid is aqueous sulphuric acid.

* * * * *